United States Patent
Pohl et al.

(10) Patent No.: US 11,841,258 B2
(45) Date of Patent: Dec. 12, 2023

(54) CORIOLIS MEASURING SENSOR AND CORIOLIS MEASURING DEVICE HAVING A CORIOLIS MEASURING SENSOR

(71) Applicant: Endress+Hauser Flowtec AG, Reinach (CH)

(72) Inventors: Johan Pohl, Freiburg (DE); Ennio Bitto, Aesch (CH)

(73) Assignee: Endress+Hauser Flowtec AG, Reinach (CH)

( * ) Notice: Subject to any disclaimer, the term of this patent is extended or adjusted under 35 U.S.C. 154(b) by 104 days.

(21) Appl. No.: 17/627,532

(22) PCT Filed: Jun. 18, 2020

(86) PCT No.: PCT/EP2020/066974
§ 371 (c)(1),
(2) Date: Jan. 14, 2022

(87) PCT Pub. No.: WO2021/008808
PCT Pub. Date: Jan. 21, 2021

(65) Prior Publication Data
US 2022/0260403 A1 Aug. 18, 2022

(30) Foreign Application Priority Data
Jul. 16, 2019 (DE) .................... 10 2019 119 231.5

(51) Int. Cl.
*G01F 1/84* (2006.01)

(52) U.S. Cl.
CPC .......... *G01F 1/8427* (2013.01); *G01F 1/8422* (2013.01); *G01F 1/8431* (2013.01); *G01F 1/8459* (2013.01)

(58) Field of Classification Search
CPC .... G01F 1/8409; G01F 1/8422; G01F 1/8427; G01F 1/8477
See application file for complete search history.

(56) References Cited

U.S. PATENT DOCUMENTS 6,138,517 A * 10/2000 Laursen ................. G01N 9/002
73/861.355

FOREIGN PATENT DOCUMENTS

| DE | 102015120087 A1 | 5/2017 |
|---|---|---|
| EP | 0874975 B1 | 11/1998 |
| EP | 1253409 A1 | 10/2002 |
| EP | 0874975 B1 | 3/2007 |
| JP | 2005106575 A | 4/2005 |
| WO | 9726508 A1 | 7/1997 |
| WO | 2019110353 A1 | 6/2019 |

* cited by examiner

*Primary Examiner* — Erika J. Villaluna
(74) *Attorney, Agent, or Firm* — Christopher R. Powers; Endress+Hauser (USA) Holding, Inc.

(57) ABSTRACT

A Coriolis measuring sensor of a Coriolis measuring device includes: at least a pair of measuring tubes; a support body; at least one exciter; and at least two electromagnetic sensors per pair of measuring tubes, wherein the electromagnetic sensors are configured to mask interference magnetic fields and to detect local inhomogeneous magnetic fields generated by magnet devices of the sensor according to a winding direction and/or an interconnection configuration of coils of the magnet devices.

12 Claims, 4 Drawing Sheets

CORIOLIS MEASURING SENSOR AND CORIOLIS MEASURING DEVICE HAVING A CORIOLIS MEASURING SENSOR

CROSS-REFERENCE TO RELATED APPLICATIONS

The present application is related to and claims the priority benefit of German Patent Application No. 102019119231.5, filed on Jul. 16, 2019, and International Patent Application No. PCT/EP2020/066974, filed Jun. 18, 2020, the entire contents of which are incorporated herein by reference.

TECHNICAL FIELD

The invention relates to a Coriolis sensor having an improved sensor system, and to a Coriolis measuring device having such a Coriolis sensor.

BACKGROUND

Coriolis measuring devices for measuring a mass flow rate or a density of a medium flowing through a measuring tube of the meter are prior art; DE102015120087A1, for example, shows a two-tube Coriolis measuring device, wherein vibration sensors are based on a magnetic coupling between a coil and a magnet.

Such Coriolis measuring devices can be manipulated by interfering with the magnetic coupling, for example by means of an external magnet. However, operation of a Coriolis measuring device in an external magnetic field also results in disturbances of the magnetic coupling. In vibrating measuring tubes, an external magnetic field causes, on the one hand, an alternating voltage directly in the coils moved with the measuring tube and, on the other hand, eddy currents, for example in walls of the measuring tube, which eddy currents distort a measurement signal detected by means of the coils.

SUMMARY

The object of the invention is to propose a Coriolis sensor, and a Coriolis measuring device having such a Coriolis sensor, in which manipulation by means of an external magnet is made more difficult.

The object is achieved by a Coriolis sensor and by a Coriolis measuring device according to the present disclosure.

A Coriolis sensor, according to the invention, of a Coriolis measuring device for measuring a mass flow rate or a density of a medium flowing through measuring tubes of the Coriolis sensor, comprises:
  at least one pair of measuring tubes for conducting a medium;
  a support body for supporting the measuring tubes;
  at least one exciter configured to excite measuring tube vibrations,
  per measuring tube pair, at least two sensors configured to detect measuring tube vibrations,
  wherein the measuring tubes of a respective measuring tube pair in the rest position are symmetrical with respect to a respective center plane, wherein the measuring tubes of each measuring tube pair are configured to carry out vibrations perpendicular to the respective center plane and to vibrate in opposite directions,
  wherein each sensor has at least one magnet device having in each case a permanent magnet and two coil devices, each having a respective coil, wherein the magnet device and the coil device are each arranged on a measuring tube,
  wherein at least one magnet device is configured to be moved relative to at least one coil device by measuring tube vibrations,
  wherein cross-sectional surfaces of the coils are identical and parallel to one another and have an overlap of at least 90% with respect to their surface dimensions in a projection of one onto the other,
  wherein mutually facing sides of the coils each define a first end face, wherein the first end faces define a coil distance, wherein a ratio of cross-sectional surface area to a square of the coil distance is, for example, greater than 10, and especially greater than 30 and preferably greater than 100,
  wherein the coils each have an inner end facing the other coil in each case, and an outer end facing away from the other coil in each case, and wherein the coils each have a winding direction,
  wherein a negative winding direction is assigned to an opposite winding direction of the two coils, and wherein a positive winding coefficient is assigned to a co-rotating winding direction of the two coils, wherein the sign of the winding coefficient is a first sign,
  wherein the coils are connected to one another in series via their ends, wherein a positive circuit coefficient is assigned to an interconnection of the coils via both inner ends or via both outer ends, wherein a negative circuit coefficient is assigned to an interconnection of the coils via one inner end and one outer end, wherein the sign of the circuit coefficient is a second sign,
  wherein a product of the first sign, second sign is negative,
  wherein the at least one permanent magnet is configured to generate, in the region of the coils, an inhomogeneous magnetic field having a field component perpendicular to the cross-sectional surfaces of the coils.

The core of the invention is that magnetic interference fields, which occur at a distance from the sensor in the measuring tube wall due to the vibrations of the measuring tubes in an external magnetic field as a result of eddy currents, are alternating fields and, in a first approximation, induce electrical voltages in coils independently of their movement state, wherein an influence of a relative movement of the coils with respect to the interference fields is negligible when the kinetic boundary conditions for Coriolis sensors are typical. By means of an interconnection according to the invention of the coils, taking into account the winding directions, the electrical voltages induced in the coils are subtracted and thus extinguished in a very good approximation.

In contrast, voltages that are induced by at least one permanent magnet of the sensor in coils of the sensor are directly dependent on a movement of the coils relative to the corresponding permanent magnet, wherein, in the presence of a magnet device, a measurement voltage is induced in at least one coil and is not extinguished in the interconnection according to the invention, and wherein, in the presence of two magnet devices, the measurement voltages induced in the coils are added due to the interconnection and arrangement according to the invention.

By means of an interconnection and embodiment of the coils according to the invention, the effect of the interference fields generated by eddy currents on the coils can thus be greatly reduced, and at the same time the measurement voltages induced by the magnet devices can be added.

A voltage induced by the external magnetic field directly in the coils also moved by the measuring tubes is unproblematic from a measuring perspective even in Coriolis sensors according to the prior art since it is in phase with the measurement voltage induced by the magnet devices and does not cause a flow rate measurement error.

It has been shown that a zero point error in a Coriolis sensor with a sensor according to the invention can be improved by a factor of greater than 10 in comparison to the known Coriolis sensors. The zero point error is given by a flow rate measured at actual zero flow.

The cross-sectional surface of the coils in this case relates in each case to a surface comprised by an outer winding.

In one embodiment, the at least one permanent magnet has a second end face which is directed toward the coil systems and runs in parallel to the cross-sectional surfaces of the coils, wherein a size of the second end face deviates by at most 50% from a size of the first end face.

This ensures a minimum amount of inhomogeneity of the magnetic field generated by the at least one permanent magnet.

In one embodiment, the second end face has a maximum distance from an outer surface of a next coil,
wherein the maximum distance is less than 5 coil distances, and especially less than 3 coil distances. and preferably less than 1.5 coil distances, and/or
wherein the maximum distance is less than 5 mm, and especially less than 3 mm, and preferably less than 1.5 mm.

In this way, a sufficient inductive effect of the at least one permanent magnet is ensured.

In one embodiment, either the winding directions are opposite, and the coils are electrically connected via both inner ends or via both outer ends, or
wherein the winding directions are the same, and the coils are electrically connected via one inner end and one outer end.

In one embodiment, a first magnet device is arranged on a first measuring tube of a measuring tube pair and is configured to follow the vibration movements of the first measuring tube, wherein the permanent magnet is configured to generate a magnetic field having a field component perpendicular to the center plane,
wherein a first coil device is arranged on the first measuring tube of the measuring tube pair, and wherein a second coil device is arranged on a second measuring tube of the measuring tube pair, wherein the coil devices are configured to follow the vibration movements of each measuring tube,
wherein cross-sections of the permanent magnet and of the coils projected onto each center plane overlap, and wherein a coil arranged on the first measuring tube is arranged especially between the permanent magnet and a coil arranged on a second measuring tube of the measuring tube pair.

In one embodiment, the sensor has a second magnet device having a permanent magnet, wherein the second magnet device is arranged on the second measuring tube of the measuring tube pair and is configured to follow the vibration movements of the second measuring tube, wherein the permanent magnet is configured to generate a magnetic field perpendicular to the center plane and opposite the magnetic field of the first magnet device,
wherein cross-sections of the permanent magnet and of the coils projected onto the respective center plane overlap, and wherein the coil arranged on the second measuring tube is arranged especially between the permanent magnet of the second magnet device and the coil of the first coil device.

The magnetic field composed of the two individual magnetic fields is thus highly inhomogeneous in the region of the coils.

In one embodiment, a first magnet device is arranged on a first measuring tube of a measuring tube pair and is configured to follow the vibration movements of the first measuring tube, wherein the permanent magnet is configured to generate a magnetic field having a field component running in parallel to the center plane,
wherein a first coil device is arranged on the first measuring tube of the measuring tube pair, and wherein a second coil device is arranged on a second measuring tube of the measuring tube pair, or
wherein a first coil device and a second coil device are arranged on a second measuring tube of the measuring tube pair,
wherein the coil devices are configured to follow the vibration movements of the respective measuring tube.

In one embodiment, a second magnet device having a permanent magnet is provided, wherein the permanent magnet of the second magnet device is oriented opposite the permanent magnet of the first magnet device,
wherein, in a projection onto the center plane, the coils are arranged between the permanent magnets.

In one embodiment, the second magnet device is arranged on the first measuring tube and is configured to follow the vibration movements of the first measuring tube, wherein the first coil device is arranged on the second measuring tube,
or wherein the second magnet device is arranged on the second measuring tube and is configured to follow the vibration movements of the second measuring tube, wherein the first coil device is arranged on the first measuring tube.

In one embodiment, the sensor has two connection wires configured to connect to an electronic measuring/operating circuit, each connection wire being connected to a coil end, wherein the connection wires are electrically insulated and are brought together, wherein the connection wires are especially twisted after they have been brought together, or
wherein the connection wires are run to a circuit board having electrically conductive conductor tracks, which conductor tracks are run in parallel at least in one connection wire/conductor track contact region and have a distance from one another that is less than two conductor track widths.

In one embodiment, the series connection of the coils is produced by means of an electrically conductive connecting wire or via a circuit board having an electrically conductive conductor track, wherein the coils are connected to the conductor track by means of electrically conductive connecting wires.

In one embodiment, a cross-sectional surface of the coils is less than 1000 square millimeters, and especially less than 500 square millimeters, and preferably less than 300 square millimeters,
and/or wherein a cross-sectional surface of the permanent magnets is less than 1000 square millimeters, and especially less than 500 square millimeters, and preferably less than 300 square millimeters.

A Coriolis measuring device according to the invention for measuring a mass flow rate or a density of a medium flowing through measuring tubes of the Coriolis sensor comprises:

a Coriolis sensor according to the invention;

an electronic measuring/operating circuit configured to operate the at least one exciter and the sensors and to provide measured values of the mass flow rate or of the density of the medium;

an electronics housing for housing the electronic measuring/operating circuit.

BRIEF DESCRIPTION OF THE DRAWINGS

The invention will now be described with reference to exemplary embodiments.

DETAILED DESCRIPTION

Figure 1:
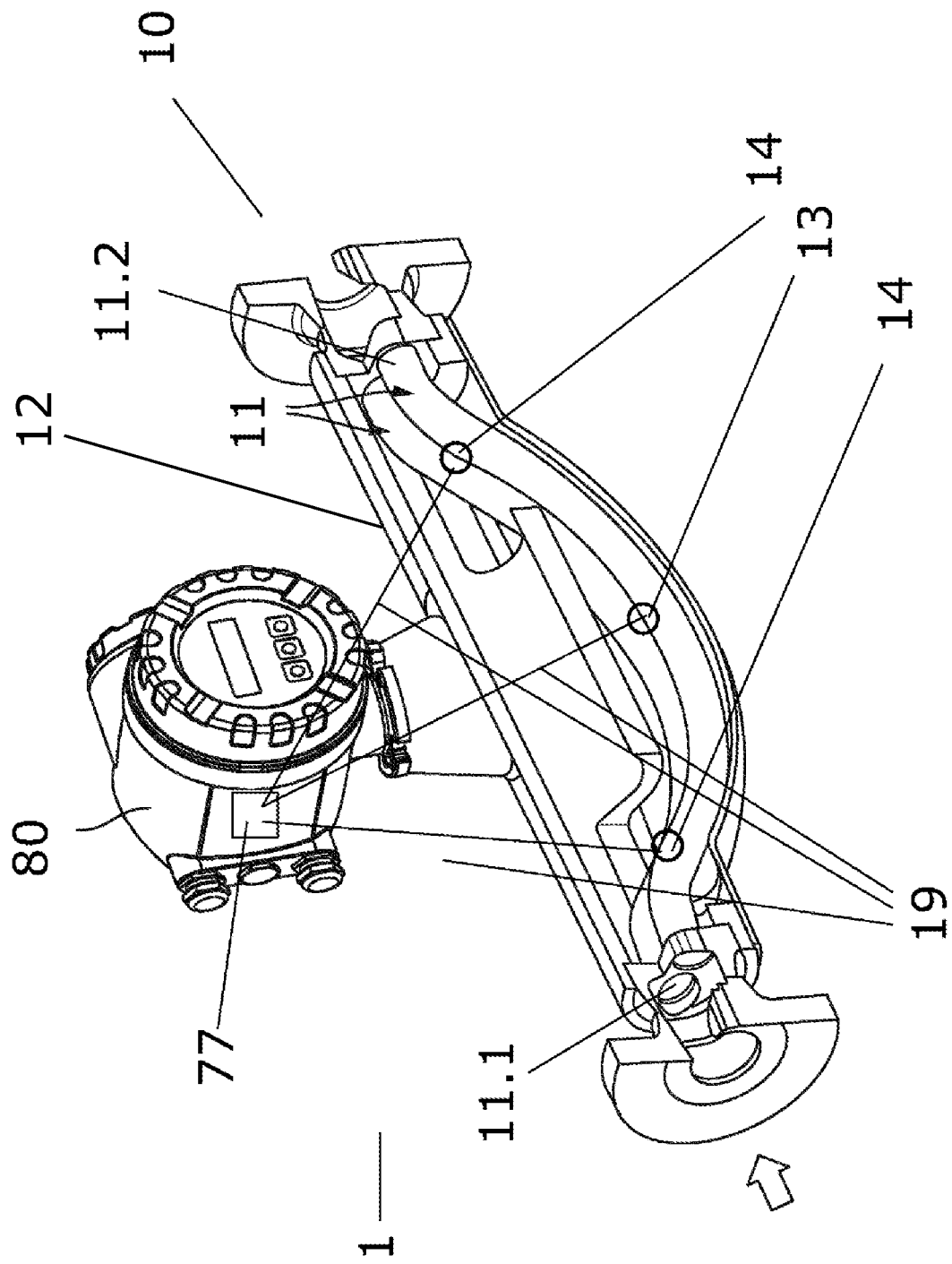
FIG. 1 shows an embodiment of an exemplary Coriolis meter with an exemplary Coriolis sensor.

FIG. 1 outlines the structure of an exemplary Coriolis measuring device 1 having an exemplary Coriolis sensor 10, wherein the Coriolis sensor has two measuring tubes 11, each having an inlet 11.1 and an outlet 11.2, a support body 12 for supporting the measuring tubes, an exciter 13, and two sensors 15. The exciter is designed to excite the two measurement tubes to vibrate perpendicular to a longitudinal measurement tube plane defined by the arc-shaped measurement tubes. The sensors are configured to detect the vibration impressed upon the measurement tubes.

The Coriolis sensing element is connected to an electronics housing 80 of the Coriolis meter, which is configured to house an electronic measuring/operating circuit 77 which is configured to operate the exciter and the sensors and to determine and provide mass flow rate values and/or density values on the basis of vibration properties of the measurement tube as measured by means of the sensors. The exciter and the sensors are connected to the electronic measuring/operating circuit by means of electrical connections 19. The electrical connections 19 can respectively be grouped together by cable guides.

A Coriolis measuring instrument according to the invention is not limited to the presence of two measurement tubes. For example, the invention can also be implemented in a four-tube meter.

Figure 2:
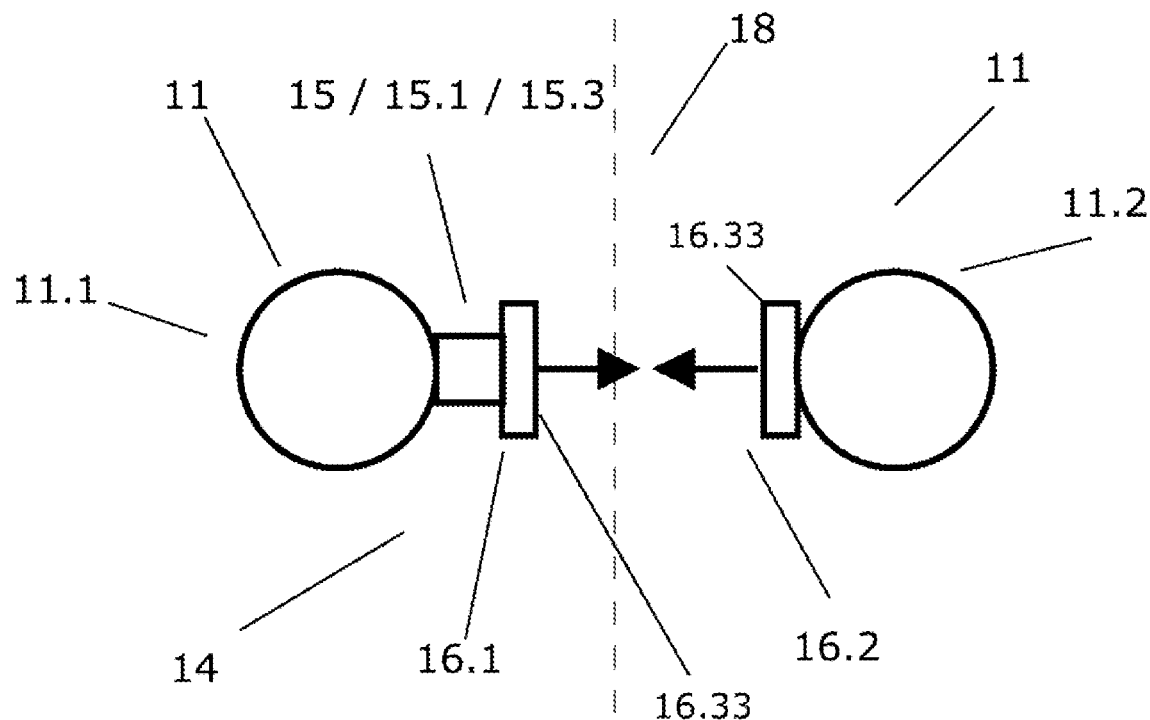
FIGS. 2 a) and 2 b) each show an arrangement of an exemplary sensor according to the present disclosure-on a measuring tube pair.
Figure 2:
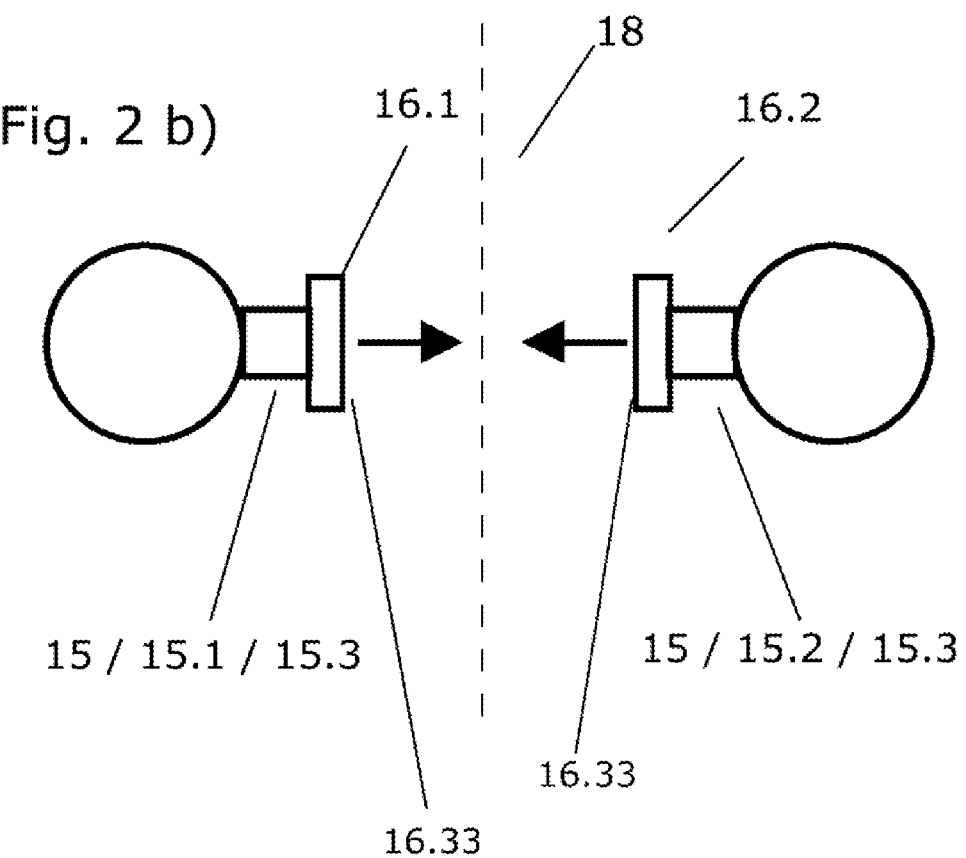

FIG. 2 a) shows an exemplary schematic arrangement of a sensor according to the invention with a first magnet device 15.1 having a permanent magnet 15.3 on a first measuring tube 11.1 and a first coil device 16.1, which is arranged on the first measuring tube, and a second coil device 16.2, which is arranged on a second measuring tube 11.2. The measuring tubes are configured to vibrate relative to one another perpendicularly to a center plane 18 so that the first magnet device in the second coil device induces an electrical voltage in a coil 16.3 of the second coil device, which voltage can be used to determine flow rate measured values. The first coil device and the first magnet device are arranged so as to be immovable relative to one another so that no electrical voltage in the coil of the first coil device is induced by the first magnet device. Cross-sections of the permanent magnet of the magnet device and of the coils of the coil devices projected onto the respective center plane 18 at least partially overlap one another.

An external magnetic field, caused for example by technical or medical devices, creates eddy currents in the measuring tube wall in vibrating measuring tubes, which eddy currents induce phase-shifted interference voltages that distort a measurement voltage in the coils of the coil devices. According to the invention, the coil of the first coil device and the coil of the second magnet device are connected in series and equipped with a respective winding direction (see FIGS. 5 a) and b)) in such a way that the interference voltages of the coils cancel one another out so that the measurement voltage induced in the coil of the second coil device remains in a very good approximation.

FIG. 2 b) shows a further exemplary schematic arrangement of a sensor, wherein, in contrast to the embodiment of the sensor shown in FIG. 2 a), a second magnet device 15.2 is provided, which is arranged on the second measuring tube. The second coil device and the second magnet device are arranged so as to be immovable relative to one another so that no electrical voltage in the coil of the second coil device is induced by the second magnet device. In contrast to the embodiment shown in FIG. 2 a), when the measuring tubes vibrate, a measurement voltage is also induced in the coil of the first coil device since a permanent magnet 15.3 of the second magnet device induces a voltage in the coil of the first coil device 16.1.

Figure 5:
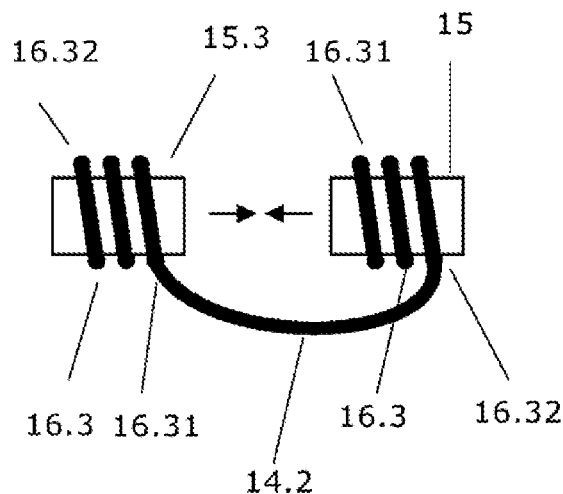
FIGS. 5 a) and 5 b) show the orientation and connection of coils of coil arrangements.
Figure 5:
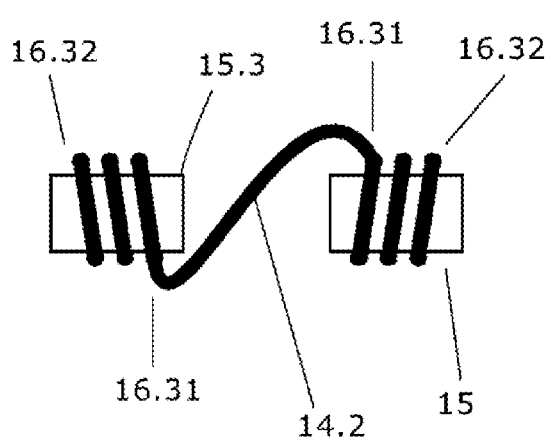

In the case of a series connection of the coil according to FIG. 5 a) or b), interference voltages cancel one another out, and the measurement signals induced in the coils are amplified. The permanent magnets are oriented to be antiparallel to one another so that the coils arranged between the permanent magnets experience a highly inhomogeneous magnetic field.

By means of the sensor according to the invention, the influence of interference magnets or external magnetic fields can thus be greatly reduced in a very simple manner without having to resort to electronic corrective measures. It has been shown that a zero point error (calculated flow rate at zero flow) of the Coriolis measuring device can be reduced to below 10% of the zero point error of a Coriolis measuring device without the sensor according to the invention.

Mutually facing sides of the coils each define a first end face 16.33, wherein the first end faces define a coil distance, wherein a ratio of cross-sectional surface area to a square of the coil distance is greater than 10, and especially greater than 30 and preferably greater than 100. This results in a spatial proximity of the coils so that, in the case of an interconnection according to the invention, they can detect exclusively local, inhomogeneous magnetic fields in a very good approximation.

Figure 3:
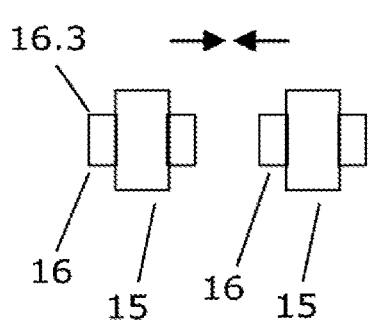
FIGS. 3 a) to 3 c) show exemplary arrangements and embodiments of coil devices and magnet devices in relation to one another.
Figure 3:
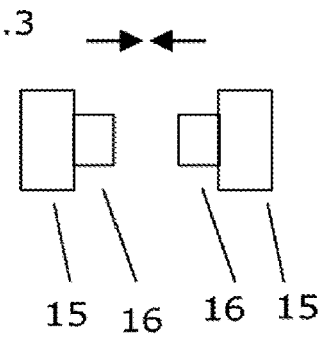

FIGS. 3 a) to 3 c) outline various exemplary embodiments of coil devices and magnet devices of a sensor having two magnet devices as shown in FIG. 2 a) and FIG. 2 b), wherein the arrows indicate a movement direction of measuring tubes.

FIG. 3 a) outlines a sensor in which a permanent magnet is arranged in the interior of an associated coil. The coil may be a winding coil. However, the coil may also be a sintered coil, especially an LTCC coil. A central region may be free of windings and/or sintered material.

FIGS. 3 b) and c) outline sensors in which coil and the associated permanent magnet are arranged one behind the other. Advantageously, the permanent magnets are arranged as shown in FIG. 3 b), oppositely to the variant shown in FIG. 3 c), on a rear side of a coil device so that a magnetic repulsion between the permanent magnets is reduced.

Figure 4:
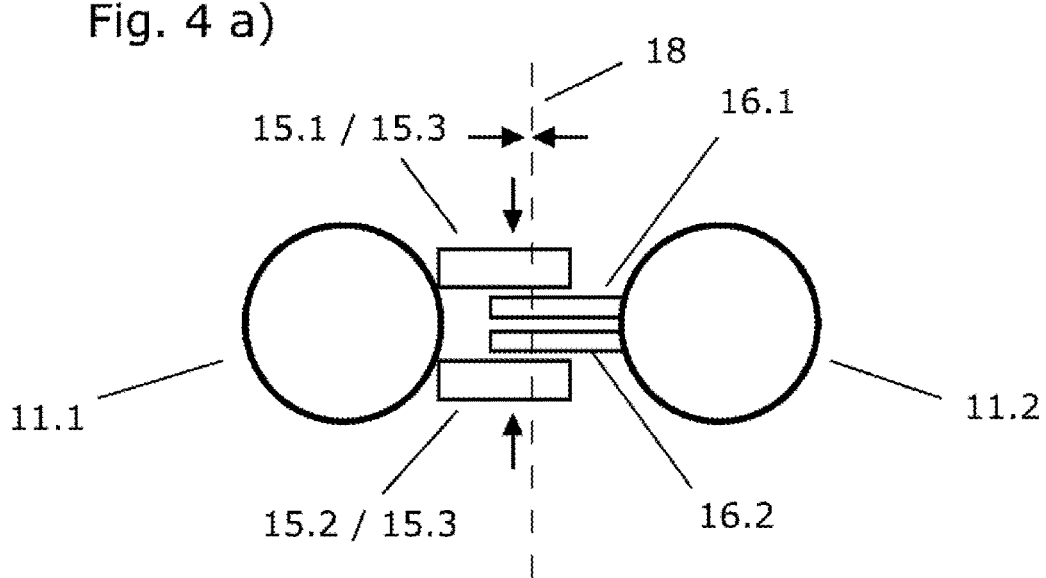
FIGS. 4 a) and 4 b) show further exemplary sensor arrangements according to the present disclosure.
Figure 4:
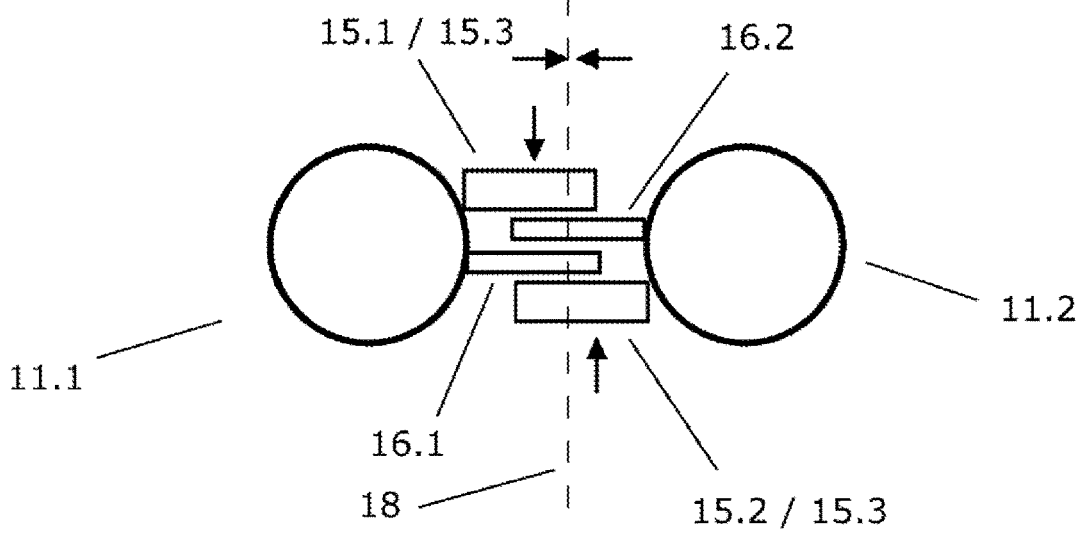

FIG. 4 a) shows a further exemplary arrangement of a sensor according to the invention, wherein a first magnet device 15.1 and a second magnet device 15.2 are fastened to a first measuring tube 11.1, and a first coil device 16.1 and a second coil device 16.2 are fastened to a second measuring tube 11.2, wherein the projections of the coils are arranged between the projections of the permanent magnets. As shown in FIGS. 2 a) and b), the measuring tubes are configured to vibrate perpendicularly with respect to the center plane 18, as indicated by the horizontal arrows. In contrast to the embodiment shown in FIGS. 2 a) and b), the permanent magnets are configured to generate magnetic fields in parallel to the center plane and opposite to one another, wherein when the measuring tubes vibrate, the coils or coil devices are moved perpendicularly to the magnetic field generated by both permanent magnets.

FIG. 4 b) shows a further exemplary arrangement of a sensor according to the invention, wherein, in contrast to the variant shown in FIG. 4 a), a coil device and a magnet device are arranged on a measuring tube.

The coil devices shown in FIGS. 2 a) to 4 b) each have a convex envelope, wherein a distance of the convex envelope along coil longitudinal axes in the rest position of the measuring tubes is ideally less than 3 millimeters, and especially less than 2 millimeters, and preferably less than 1.5 millimeters. Measurement voltages can thus be induced better and more effectively in the coils.

The fastening of the coil devices and of the magnet devices on the respective measuring tubes can take place directly or, for example, via a holder (not shown). For the person skilled in the art, it is a standard task to select a fastening method. In order to minimize sensor mass so that it has only negligible influence on the measuring tube vibrations, a cross-sectional surface area of the coils is less than 1000 square millimeters, and especially less than 500 square millimeters and preferably less than 300 square millimeters, and/or a cross-sectional surface area of the permanent magnets is less than 1000 square millimeters, and especially less than 500 square millimeters, and preferably less than 300 square millimeters.

According to the embodiments shown in FIGS. 2 a) and b), only one magnet device each can also be arranged in the embodiments shown in FIGS. 4 a) and b).

FIGS. 5 a) and 5 b) each outline a series connection according to the invention of the coils to one another on the basis of exemplary coils and permanent magnets.

The magnetic field of a permanent magnet 15.3 of the first/second magnet device, which field is variable due to measuring tube vibrations, in the reference system of a coil of the second/first coil device induces an electrical voltage in the coil according to Faraday's induction law, wherein electrons experience a force perpendicular to an orientation of the magnetic field. Since between the magnet devices, the magnetic field of the first magnet device is opposite to the magnetic field of the second magnet device, the force on electrons in the coil of the first coil device is opposite to the force on electrons in the coil of the second coil device. In order to obtain a measurement voltage addition of the measurement voltages generated in the coils when the coils are arranged on different measuring tubes, either the winding directions of the coils must be opposite and the coils must be electrically connected via both inner coil ends 16.31 (see FIG. 5 b)) or via both outer ends, or the winding directions must be the same and the coils must be electrically connected via one inner end and one outer end (FIG. 5 a).

The core of the invention is therefore that magnetic interference fields, which, for the most part, arise at some distance from the sensor, have the same field gradient in both coil systems of a sensor in a very good approximation and thus interfere destructively in their inductive effect as a result of the claimed interconnection of the coils.

The compensation of the interference voltages functions in the same way in a sensor with two coil devices and one magnet device.

As shown in FIGS. 5 a) and 5 b), the coils can be connected by means of an electrically conductive connecting wire 14.2.

Figure 6:
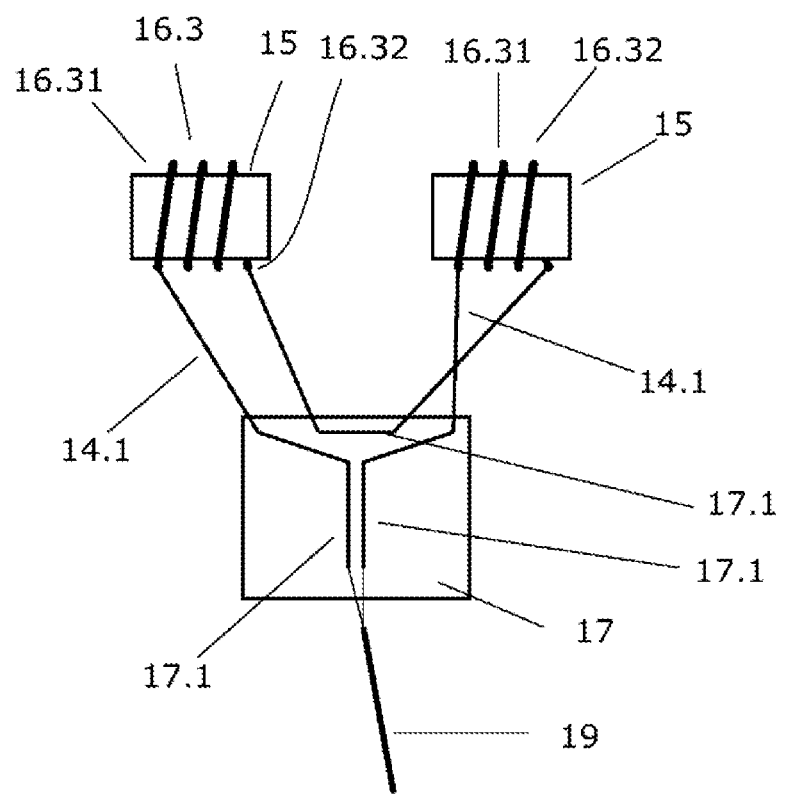
FIG. 6 shows exemplary connections of a sensor to a circuit board.

FIG. 6 illustrates an exemplary connection of the sensor to a circuit board 17, wherein connection wires 14.1 for connecting the coils to an electronic measuring/operating circuit are run in each case to a electrically conductive conductor track 17.1 of the circuit board. The conductor tracks are brought together and then run in parallel to one another. A magnetic loop can thus be reduced. As shown here, the series connection of the coils can, in contrast to what is shown in FIGS. 5 a) and 5 b), be ensured via an electrically conductive conductor track 17.1. The measurement voltages can then be conducted to the electronic measuring/operating circuit by means of an electrical connection 19.

As an alternative to the circuit board, the connection wires can also be twisted in order to reduce a magnetic loop.

The invention claimed is:

1. A Coriolis sensor of a Coriolis measuring device for measuring a mass flow rate or a density of a medium flowing through measuring tubes of the Coriolis sensor, the Coriolis sensor comprising:
    at least one pair of measuring tubes adapted to convey a medium therethrough;
    a support body configured to support the measuring tubes;
    at least one exciter configured to excite vibrations in the measuring tubes; and
    for each measuring tube pair, at least two electromagnetic sensors configured to detect the measuring tube vibrations,
    wherein the measuring tubes of a respective measuring tube pair are symmetrical relative to a respective center plane in a rest position, wherein the measuring tubes of each measuring tube pair are configured to execute vibrations perpendicular to the respective center plane and to vibrate in opposite directions,
    wherein:
        each electromagnetic sensor includes at least one magnet device, each including a permanent magnet and two coil devices, each including a coil;
        the at least one magnet device is configured to be moved relative to at least one coil device by the measuring tube vibrations;
        cross-sectional surfaces of the coils are parallel and equal to each other and have an overlap of at least 90% with respect to their surface dimensions in a projection onto each other;
        mutually facing sides of the coils each define a first end face, wherein the first end faces define a coil distance, wherein a ratio of a cross-sectional surface area to a square of the coil distance of respective coils is greater than 10;

the coils each have an inner end facing the respective other coil and an outer end facing away from the respective other coil, and wherein the coils each have a winding direction;

a negative winding coefficient defines an opposite winding direction of the coils, and wherein a positive winding coefficient defines to a same winding direction of the coils, wherein a first sign is defined by whether the winding coefficient is negative or positive;

the coils are connected to each other in series via either their inner ends or their outer ends, wherein a positive circuit coefficient defines an interconnection of the coils via both inner ends or via both outer ends, wherein a negative circuit coefficient defines an interconnection of the coils via one inner end and one respective outer end, wherein a second sign is defined by whether the circuit coefficient is negative or positive;

a product of the first sign and the second sign is negative; and the permanent magnet of the at least one magnet device is:
 configured to generate, in the region of the coils, an inhomogeneous magnetic field having a field component perpendicular to the cross-sectional surfaces of the coils; and
 includes a second end face directed toward the coil devices and extending parallel to the cross-sectional surfaces of the coils, wherein a size of the second end face deviates by at most 50% from a size of the first end face.

2. The Coriolis sensor of claim 1, wherein at least one of the following is met:
 the second end face has a maximum distance to a coil center plane defined by the first end faces;
 the maximum distance is less than 7 coil distances; and
 the maximum distance is less than 7 mm.

3. The Coriolis sensor of claim 1, wherein:
 the winding directions are opposite, and the coils are electrically connected via both inner ends or via both outer ends; or
 the winding directions are the same, and the coils are electrically connected via one inner end and one respective outer end.

4. The Coriolis sensor of claim 1, wherein a first magnet device of the at least one magnet device is disposed on a first measuring tube of the at least one measuring tube pair and is configured to follow the vibrations of the first measuring tube, wherein the permanent magnet of the first magnet device is configured to generate a magnetic field having a field component perpendicular to the corresponding center plane,
 wherein a first coil device of the two coil devices is disposed on the first measuring tube, and wherein a second coil device of the two coil devices is disposed on a second measuring tube of the at least one measuring tube pair, wherein the first and second coil devices are configured to follow the vibrations of the respective measuring tube, and
 wherein cross-sections of the permanent magnet and of the coils projected onto the corresponding center plane overlap, and wherein the coil of the first coil device disposed on the first measuring tube is disposed between the permanent magnet and the coil of the second coil device disposed on the second measuring tube.

5. The Coriolis sensor of claim 4, wherein a second magnet device of the at least one magnet device is disposed on the second measuring tube and is configured to follow the vibrations of the second measuring tube, wherein the permanent magnet of the second magnet device is configured to generate a magnetic field perpendicular to the corresponding center plane and opposite to the magnetic field of the first magnet device, and
 wherein cross-sections of the permanent magnet and of the coils projected onto the corresponding center plane overlap, and wherein the coil of the second coil device disposed on the second measuring tube is disposed between the permanent magnet of the second magnet device and the coil of the first coil device.

6. The Coriolis sensor of claim 1, wherein a first magnet device of the at least one magnet device is disposed on a first measuring tube of the at least one measuring tube pair and is configured to follow the vibrations of the first measuring tube, wherein the permanent magnet of the first magnet device is configured to generate a magnetic field having a field component extending parallel to the corresponding center plane, and
 wherein a first coil device of the two coil devices is disposed on the first measuring tube, and wherein a second coil device of the two coil devices is disposed on a second measuring tube of the measuring tube pair, or wherein the first coil device and the second coil device are disposed on the second measuring tube,
 wherein the first and second coil devices are configured to follow the vibrations of their corresponding measuring tube.

7. The Coriolis sensor of claim 6, wherein the permanent magnet of a second magnet device of the at least one magnet device is oriented to be opposite to the permanent magnet of the first magnet device,
 wherein, in a projection onto the corresponding center plane, the coils are disposed between the permanent magnets.

8. The Coriolis sensor of claim 7, wherein the second magnet device is disposed on the first measuring tube and is configured to follow the vibrations of the first measuring tube, wherein the first coil device is disposed on the second measuring tube, or
 wherein the second magnet device is disposed on the second measuring tube and is configured to follow the vibration movements of the second measuring tube, wherein the first coil device is disposed on the first measuring tube.

9. The Coriolis sensor of claim 1, wherein each electromagnetic sensor of the at least two sensors includes two connection wires configured to connect to an electronic measuring/operating circuit, each connection wire connected to a coil end, wherein the connection wires are electrically insulated and twisted together, or
 wherein the connection wires are routed to a circuit board including electrically conductive conductor tracks that extend parallel to each other at least in a segment of the conductor tracks, which are separated from each other by less than two conductor track widths.

10. The Coriolis sensor of claim 1, wherein the series connection of the coils is effected by an electrically conductive connecting wire or via a circuit board including an electrically conductive track, wherein the coils are connected to the conductor track via electrically conductive connecting wires.

11. The Coriolis sensor of claim 1, wherein a cross-sectional surface of the coils is less than 1000 square millimeters, and/or
wherein a cross-sectional surface of the permanent magnets of the at least two electromagnetic sensors is less than 1000 square millimeters.

12. A Coriolis measuring device for measuring a mass flow rate or a density of a medium flowing through measuring tubes of the Coriolis sensor, the measuring device comprising:
a Coriolis sensor according to claim 1;
an electronic measuring/operating circuit configured to operate the at least one exciter and the at least two electromagnetic sensors and to generate measured values of the mass flow rate or the density of the medium; and
an electronics housing configured to contain the electronic measuring/operating circuit.

\* \* \* \* \*